United States Patent [19]

Lajeunesse

[11] Patent Number: 5,660,949
[45] Date of Patent: Aug. 26, 1997

[54] BATTERY ELECTROLYTE ADDITIVE

[75] Inventor: Yves Lajeunesse, Palm Beach Gardens, Fla.

[73] Assignee: Valany Import Export, Inc., Palm Beach Gardens, Fla.

[21] Appl. No.: 643,969

[22] Filed: May 7, 1996

[51] Int. Cl.⁶ .................................................. H01M 10/08
[52] U.S. Cl. ........................... 429/198; 429/189; 429/204
[58] Field of Search ........................ 429/189, 204, 429/198

[56] References Cited

U.S. PATENT DOCUMENTS 1,512,485  10/1924  Pouchain .
3,891,599   6/1975  Marciniak et al. .
4,082,725   4/1978  Anderson .
4,427,750   1/1984  Bilodeau et al. .

*Primary Examiner*—John S. Maples
*Attorney, Agent, or Firm*—McHale & Slavin, P.A.

[57] ABSTRACT

The instant invention is an electrolyte additive for use with lead acid batteries containing antimony. The electrolyte additive consists of a mixture of synthetic oil, naphthenic oil, zinc free rust and oxidation inhibitor and an ethylene-propylene copolymer. So as to allow for faster mixing of the material an anti-foaming agent may be added and the additive is receptive to the addition of dye allowing the consumer to distinguish the additive from a sulfuric acid solution. The electrolyte additive is placed above the plate cells in lead acid batteries having antimony to inhibit gassing and misting with an ancillary benefit of increasing performance and durability of the battery.

13 Claims, No Drawings

BATTERY ELECTROLYTE ADDITIVE

FIELD OF THE INVENTION

This invention relates to lead acid batteries and, in particular an electrolyte additive for lead acid batteries having at least one cell plate containing antimony for the reduction of gassing, misting, and water consumption thereby providing battery longevity.

BACKGROUND OF THE INVENTION

Lead acid batteries are commonly used in automobiles, recreation vehicles, aircraft, and so forth where a strong current of electricity is necessary for starting of an internal combustion engine. Lead acid batteries operate on the principal that when two dissimilar metals are immersed in an electrolyte, a voltage develops between them.

The dissimilar metals in conventional lead acid batteries are characterized as positive plates and negative plates. Positive plates are made from a compound of lead and oxygen forming lead dioxide ($PbO_2$). The negative plates are made of lead metal typically spongy in texture. The electrolyte consists of sulfuric acid ($H_2SO_4$) and water. Common battery electrolyte concentration is approximately 25% volume of acid and 75% water.

During the discharge of a battery, when current flows from the battery to an external load, lead in the positive plate leaches off and combines with sulphite from the electrolyte to form lead sulphite ($PbSO_4$) on the positive plates. The negative lead electrode disassociates into free electrons and positive lead ions. Thus, the lead dioxide combines with the positive hydrogen ions in the electrolyte with the returning electrons to form water, thereby releasing lead ions into the electrolyte to form additional lead sulphite. As the oxygen on the positive plates combines with hydrogen from the sulfuric acid to form water, the result is a reduction in the concentration of the electrolyte thereby lowering the specific gravity of the electrolyte. A fully charged battery will have an electrolyte specific gravity of 1.265 when corrected to 26.7° C. A battery electrolyte with a specific gravity of 1.120 is considered completely discharged.

When the battery is charged, a current is passed through the battery in the opposite direction to restore the active chemicals to their original condition. In this manner, the lead sulphite ($PbSO_4$) that was formed on both plates is broken up into $Pb$ and $SO_4$. The water disassociates into hydrogen and oxygen. In this manner, the sulphite can now combine with the hydrogen to reform sulfuric acid ($H_2SO_4$) while the oxygen combines with the lead to form lead dioxide ($PbO_2$). The sulfuric acid that is forming is more dense than the water that is disappearing which results in the specific gravity of the electrolyte to increase.

Lead acid batteries may employ antimony as a constituent to increase the strength and other physical properties of lead. When antimony is added to the lead in both the positive and negative plates, it is referred to as an antimony-antimony battery, or deep cycle. However, antimony increases hydrogen production at the negative plate, and oxygen at the positive plate, as water is being decomposed. This can be visualized through bubbling, gassing, or misting. The result is a decomposed mixture which forms a highly explosive situation. This type of battery is used in recreation vehicles, electric cranes, electric cars, golf carts, and so forth.

An alternative to the deep cycle battery is the recently introduced calcium-antimony battery, also referred to as a hybrid battery. This battery has a positive cell consisting of antimony integrated into the lead and a negative cell consisting of calcium integrated into the lead. The hybrid battery maintains some of the beneficial properties of the deep cycle battery, such as repeatable cycling, while the hydrogen gas production is decreased. Thus, the need for adding water is reduced but not eliminated making it a low maintenance battery. The hybrid battery allows for general use with nearly any type of vehicle.

Still another style of battery is the calcium filled battery which is commonly referred to as the "maintenance free" battery. The positive and negative plate cells each contain calcium eliminating the need to add water during the life of the battery. The lack of antimony reduces gas generation and associated depletion of the electrolyte. A disadvantage of the maintenance free battery is the lack of mechanical properties comparable to the antimony battery, in particular, the ability to deep cycling such a battery is not possible. Deep cycling causes the calcium plate cells to grow mechanically or creep. Should creep become excessive, adjacent parts may short out thereby disabling the battery or severely reducing its capacity. This prohibits the use of a calcium-calcium battery for use in deep discharge applications wherein the breakdown of the grid-paste interface results in loss of battery capacity.

Both the antimony-antimony and calcium-antimony batteries, commonly referred to throughout this specification as lead acid antimony batteries, are capable of withstanding repeated cycling and will generally accept a charge more readily than a calcium battery. However, higher charge acceptance of the antimony battery causes increased water consumption, gassing, and the resultant external corrosion problems. If the lead antimony battery is not properly maintained, battery trays, and cables will require regular replacement due to corrosion and possible boil over problems. Water can be added to a battery but is a maintenance step seldom performed by the average consumer. Further, low mineral content water must be used and should the battery be overfilled, an overflow of the cells may occur causing metal degradation to the area surrounding the battery.

The sulfate conversion and hydrogen production also causes a strong offensive odor which can be harmful to breath for people with serious health problems. For example, wheelchair occupants must endure fumes if their battery operated wheelchair is recharged while occupied. Recreational vehicles and boats may have their batteries cycled repeatedly while parked wherein misting from the battery may cause corrosion of the surrounding metals. For this reason such vehicles may employ a specialty battery compartment designed to control the corrosion. Alternatively, the batteries may be placed within non-corroding boxes to prevent spreading of fumes. However, closed spaces may increase acid deposits promoting post and cable corrosion resulting in current leakage across the battery top.

In an effort to reduce the aforementioned problems associated with lead antimony batteries, prior art teachings disclose various electrolyte additives. One such additive is the use of oil as set forth in U.S. Pat. No. 1,512,485. In this disclosure, the use of an electrolyte containing a hydrocarbon is proposed such as "reduced oils" made from the residual of crude oils. While the disclosure describes the use of an oil, it fails to provide an operative electrolyte.

U.S. Pat. No. 4,427,750 discloses a specialized battery including an oil additive stating an electrolyte of 20% volume sulfuric acid and 80% refined mineral oil with acetic acid. This disclosure does not operate with conventional batteries as the proposed amount of mineral oil and acetic acid provides little or no battery capacity. The positive and negative plates cannot be immersed in oil or acetic acid without having a detrimental effect on the battery's capacity.

Thus, what is lacking in the art is an electrolyte additive that reduces or eliminates hydrogen gassing and associated water loss in lead antimony batteries in such a level so as to beneficially effect the capacity of the battery providing longevity through the acceptance of increased cycling amounts.

SUMMARY OF THE INVENTION

The instant invention is an electrolyte additive which replaces part of the sulfuric acid electrolyte. The additive improves battery performance, reliability, and safety, as well as reduces the needed maintenance of replacement water. In addition, the reduction of the amount of sulfuric acid within the battery reduces the amount of corrosive substance that could be spilled should a battery housing rupture or be handled incorrectly. Moreover, should a rapid charge of a battery occur, the oil additive reduces the amount of gassing or misting and associated offensive odors which are corrosive to the surrounding components, as well as harmful to any individual who should breathe the vapors.

The electrolyte additive has a particular application for lead antimony acid batteries comprising about 64.5% synthetic oil such as that produced by Kendall Oil under product number 6 cST PAO, 23.0% naphthenic oil such as 45 SUS, 1.5% zinc free rust and oxidation inhibitor, and 11.0% ethylene-propylene copolymer. In a solution of one gallon, about 100 ppm antifoaming material and 200 ppm of dye may also be added. The electrolyte constitutes less than 30 percent of the liquid volume of a battery and has a specific gravity of less than 0.9. The additive is placed above the plate cells providing a blanket to reduce water loss.

Thus, an objective of the instant invention is to disclose an electrolyte additive that increases the cycling longevity of lead antimony acid batteries and increase performance durability in hot and cold weather without water addition.

Another objective of the instant invention is to disclose an electrolyte additive that reduces hydrogen gassing, misting, and the associated mist to reduce or eliminate post and cable corrosion, and eliminate the damaging effect of conventional sulfuric acid electrolyte from causing external corrosion of the surrounding metal.

Still another objective of the instant invention is to reduce or eliminate offensive odors while increasing safety through the reduction of hydrogen gassing.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Although the invention will be described in terms of a specific embodiment, it will be readily apparent to those skilled in this art that various modifications, rearrangements, and substitutions can be made without departing from the spirit of the invention. The scope of the invention is defined by the claims appended hereto.

The instant invention is an electrolyte additive for use with lead antimony acid batteries comprising synthetic oil, naphthenic oil, a zinc free rust and oxidation inhibitor, and an ethylene-propylene copolymer. The electrolyte is based upon the primary constituent of synthetic oil which consists of a solution having between 60–70% synthetic oil, such as that produced by Kendall Oil Products under product number 6 cST POA which may be colored by the addition of a dye allowing the consumer to distinguish the additive when placed above the cell plates.

In a container the synthetic oil is mixed with a volume of between 20–25% naphthenic oil such as 45 SUS followed by the addition of between 1–2% zinc free rust and oxidation inhibitor. In addition, between 10–15% ethylene-propylene copolymer is admixed to the formula and agitated sufficiently. In a one gallon solution, it is recommended that approximately 100 ppm of anti-foaming material be added to prevent foaming during mixing or should subsequent shaking occur. It is recommended that 200 ppm of dye, such as red/blue be added to the electrolyte additive providing a distinguishable color, yet not affecting the operation of the additive.

The additive is used in combination with a sulfuric acid electrolyte having a concentration of about 75% sulfuric acid and 25% water. The additive is inserted into a battery providing a volume of about 20% electrolyte additive and 80% electrolyte concentration. Some batteries may be able to handle up to 30% electrolyte additive, but care must be taken not to allow the additive to contact the cell plates.

Once inserted into a battery, according to the amounts set forth below, the battery can be charged in its ordinary and conventional manner so as to provide optimum battery life. The electrolyte additive effectively provides a coating over the electrolyte so as to inhibit gassing and misting, as well as water loss through evaporation thereby extending the life of the battery.

The electrolyte additive is added to a battery in the following manner. In a lead antimony battery, an electrolyte having a concentration of about 75% sulfuric acid and about 25% water is placed into the battery housing in a sufficient amount to cover cell plates. The electrolyte additive, consisting of at least synthetic oil, naphthenic oil, and ethylene-propylene copolymer is added to each cell to provide a depth between 13 mm and 18 mm over the electrolyte. It is important that the additive is placed above the top of the plates. After the additive is added, a topping amount of electrolyte over the additive is recommended to bring the liquid volume in the battery to a level of about ⅛ inch beneath the bottom of the vent tube well of said housing. If the volume drops to the point where the additive contacts the cell plates, distilled water may be used to raise the level.

The amount of electrolyte added is dependant upon the type of battery and ranges from between 9 to 39 ounces for most lead acid batteries. Table one is a list of the most popular lead acid battery sizes and provides the particular amount of electrolyte additive for each size.

TABLE 1

| Ounces of oil per battery | |
|---|---|
| Battery type | Ounces |
| Mar-40, -50 | 12 |
| Mar 27 | 15 |
| Porsche 911 | 12 |

TABLE 1-continued

Ounces of oil per battery

| Battery type | Ounces |
| --- | --- |
| U1 | 3 |
| UT | 9 |
| 1 | 9 |
| 1–8 volt | 9 |
| 1BS | 18 |
| 2 | 9 |
| 2N | 9 |
| 2–8 volt | 12 |
| 3EE | 15 |
| 3EH | 15 |
| 3ET | 15 |
| 3HC | 18 |
| 4 | 18 |
| 4D | 36 |
| 4DL | 15 |
| 4H | 18 |
| 5D | 18 |
| 6D | 36 |
| 7D | 18 |
| 8D | 39 |
| 17HF | 9 |
| 17TF | 9 |
| 19L | 9 |
| 21 | 9 |
| 22F | 9 |
| 22NF | 9 |
| 24 | 12 |
| 24F | 12 |
| 24LTV | 12 |
| 24FFLTV | 12 |
| 24T | 12 |
| 25 | 9 |
| 26 | 9 |
| 27 | 15 |
| 27F | 15 |
| 27FLTV | 15 |
| 27LTV | 15 |
| 27T | 15 |
| 29NF | 12 |
| 30, 31 deep cycle | 15 |
| 30H | 15 |
| 31S | 15 |
| 31T | 15 |
| 34 | 12 |
| 35 | 9 |
| 41 | 9 |
| 42 | 9 |
| 45 | 9 |
| 46 | 9 |
| 47 | 12 |
| 48 | 12 |
| 49 | 18 |
| 51 | 9 |
| 52 | 9 |
| 53 | 9 |
| 55 | 6 |
| 58 | 9 |
| 62 | 12 |
| 64 | 15 |
| 65 | 12 |
| 70 | 9 |
| 71 | 9 |
| 72 | 9 |
| 74 | 12 |
| 74LTL | 12 |
| 75 | 9 |
| 78 | 12 |
| 78LTL | 12 |
| U.S. 6-Volt-2200 | 15 |
| U.S. 6-Volt-2400 | 15 |
| U.S. 6-Volt-2500 | 18 |
| U.S. 6-Volt-3050 | 18 |
| L-16 | 18 |
| U.S. 12-Volt-1450 | 18 |
| U.S. 12-Volt-1850 | 18 |
| Golf Car | 15 |

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

What is claimed is:

1. Art electrolyte additive for lead acid batteries having antimony, said additive comprising: synthetic oil, naphthenic oil, and an ethylene-propylene copolymer.

2. The electrolyte additive for lead acid batteries according to claim 1 including a zinc free rust and oxidation inhibitor.

3. The electrolyte additive for lead acid batteries according to claim 1 including an anti-foaming ingredient.

4. The electrolyte additive for lead acid batteries according to claim 1 including a dye.

5. The electrolyte additive for lead acid batteries according to claim 1 wherein said synthetic oil approximates at least 60% by volume of said electrolyte additive.

6. The electrolyte additive for lead acid batteries according to claim 1 wherein said additive is used in combination with a sulfuric acid electrolyte concentration consisting of approximately 75% by volume sulfuric acid and approximately 25% by volume water.

7. The electrolyte additive for lead acid batteries according to claim 6 wherein said additive is added to a battery providing a volume of approximately 20% electrolyte additive and 80% sulfuric acid electrolyte.

8. The electrolyte additive for lead acid batteries according to claim 6 wherein said additive constitutes less than 30% of the liquid volume of said battery.

9. An electrolyte additive for lead acid batteries having antimony, said additive comprising by volume: approximately 64.5% synthetic oil; approximately 23.0% naphthenic oil; approximately 1.5% zinc free rust and oxidation inhibitor; approximately 11.0% ethylene-propylene copolymer; and approximately 100 ppm anti-foaming material.

10. The electrolyte additive for lead acid batteries according to claim 9 wherein said additive is used in combination with a sulfuric acid electrolyte concentration of approximately 75% by volume sulfuric acid and approximately 25% by volume water.

11. The electrolyte additive for lead acid batteries according to claim 9 wherein said synthetic oil is Kendall 6 cST poly alpha olefin.

12. The electrolyte additive for lead acid batteries according to claim 9 wherein said Naphthenic oil is 45 SUS.

13. The electrolyte additive for lead acid batteries according to claim 9 including approximately 200 ppm of dye.

* * * * *